(No Model.) 5 Sheets—Sheet 2.
T. G. BENNETT & W. MASON.
MAGAZINE FIREARM.
No. 599,587. Patented Feb. 22, 1898.
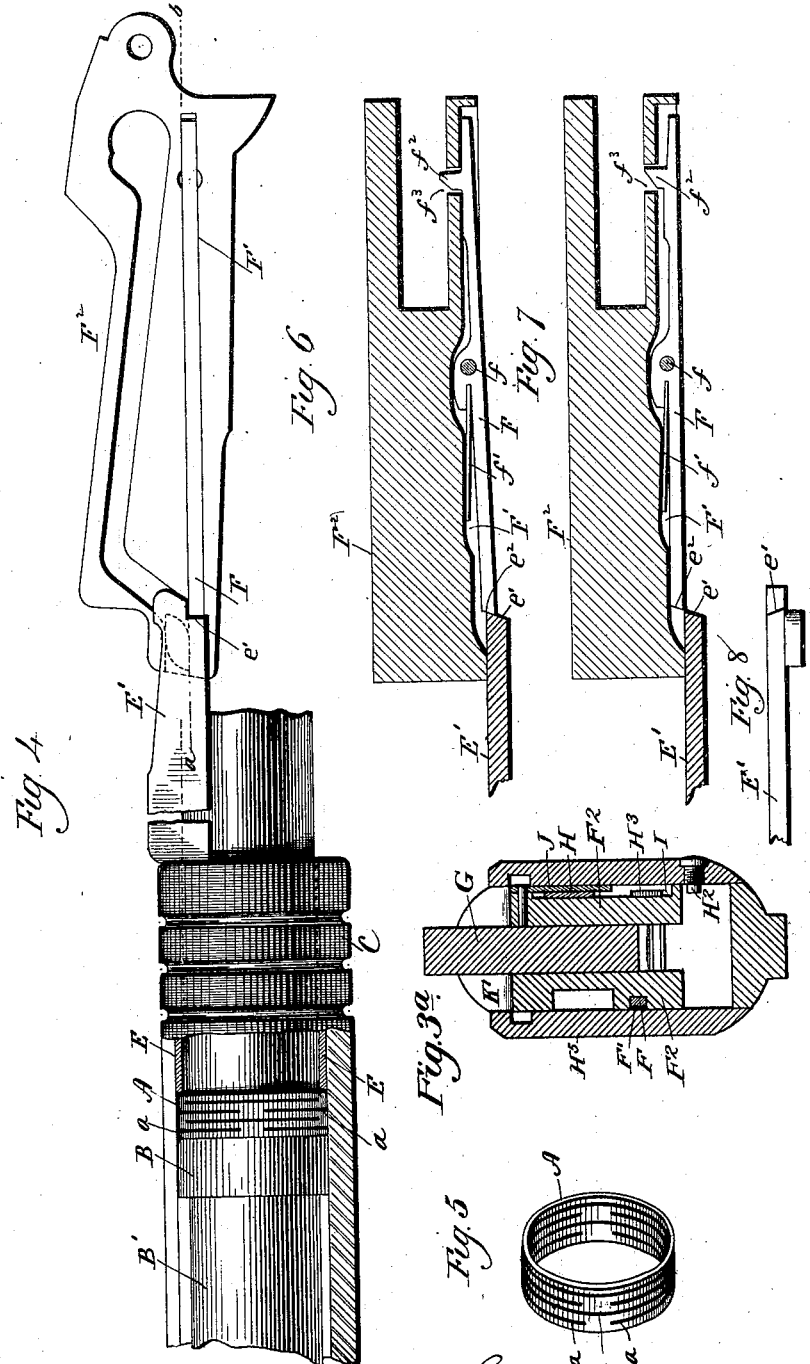

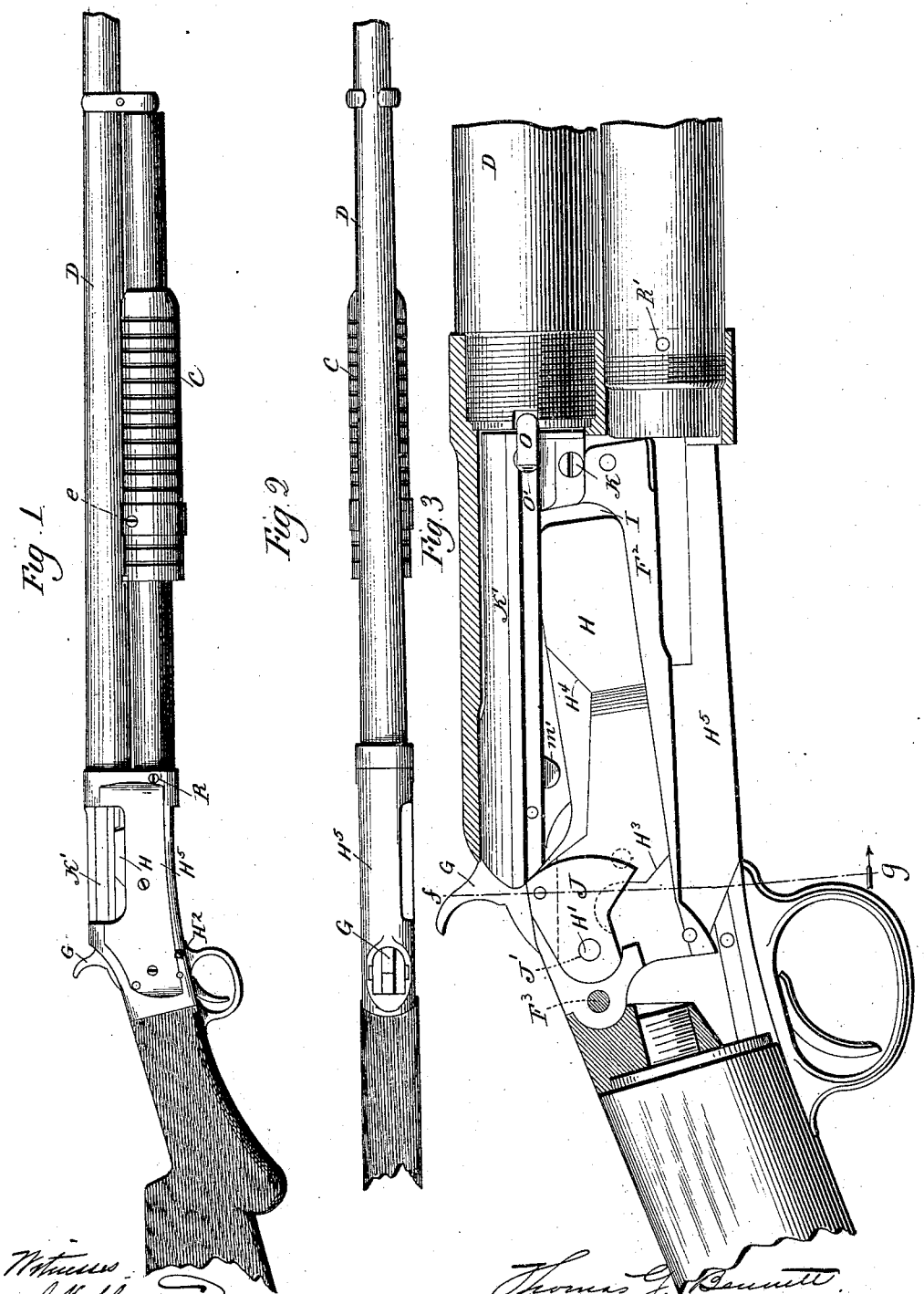

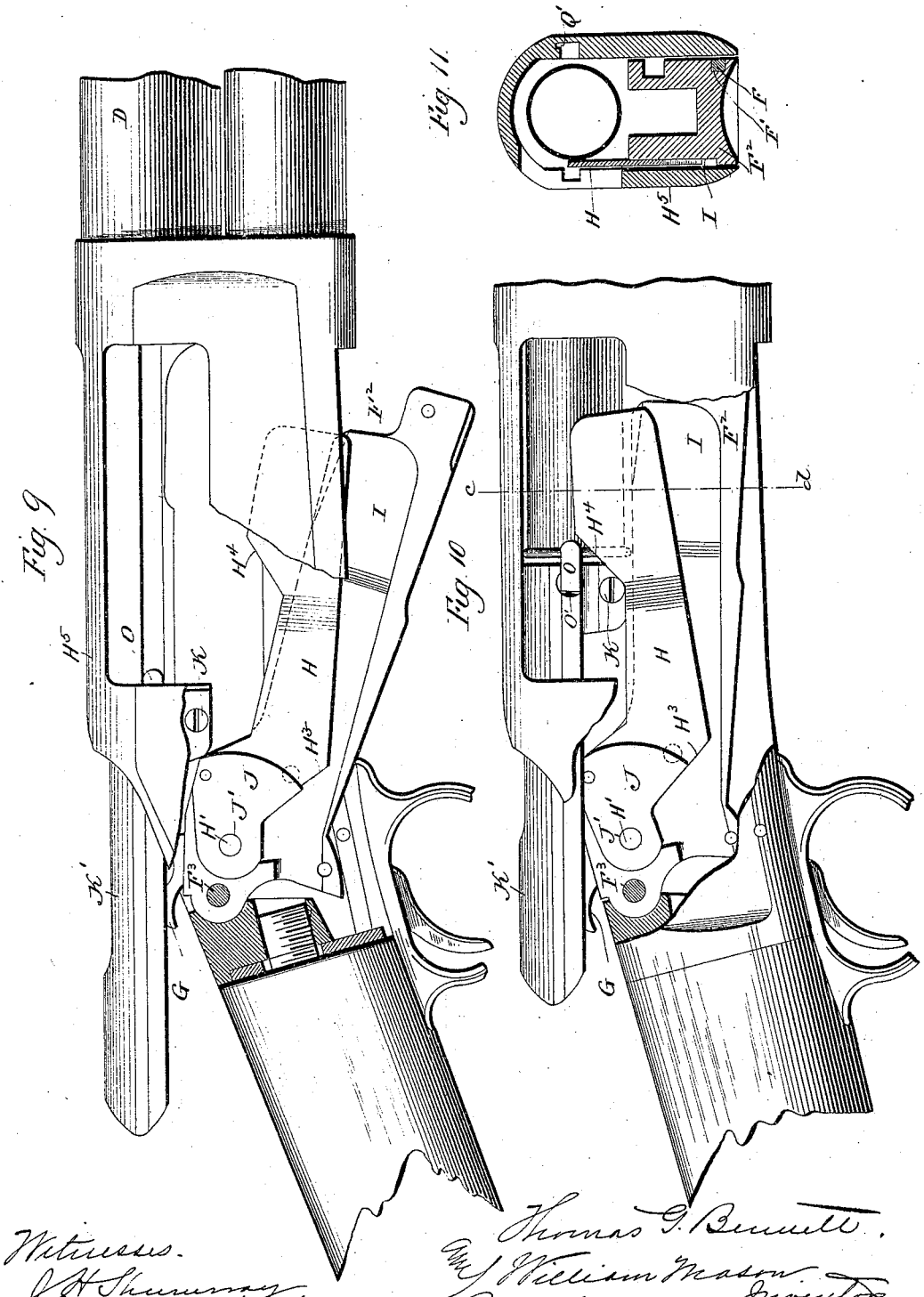

(No Model.) 5 Sheets—Sheet 4.
T. G. BENNETT & W. MASON.
MAGAZINE FIREARM.
No. 599,587. Patented Feb. 22, 1898.
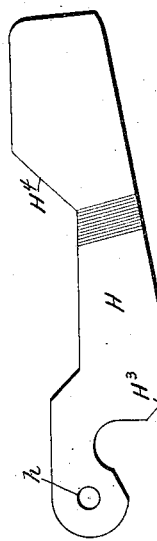
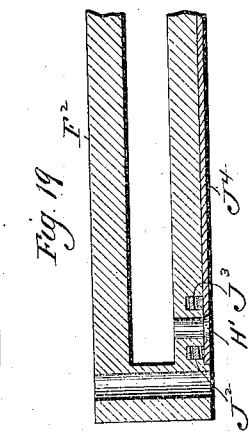
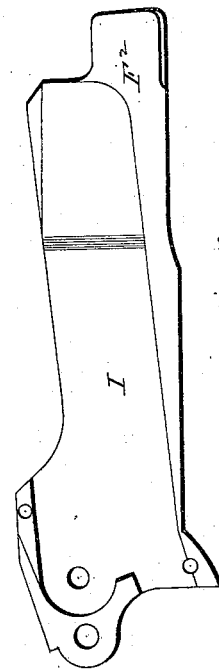
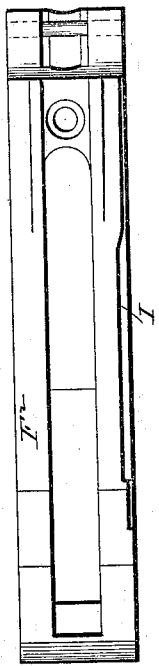
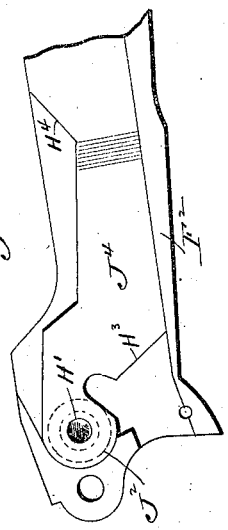

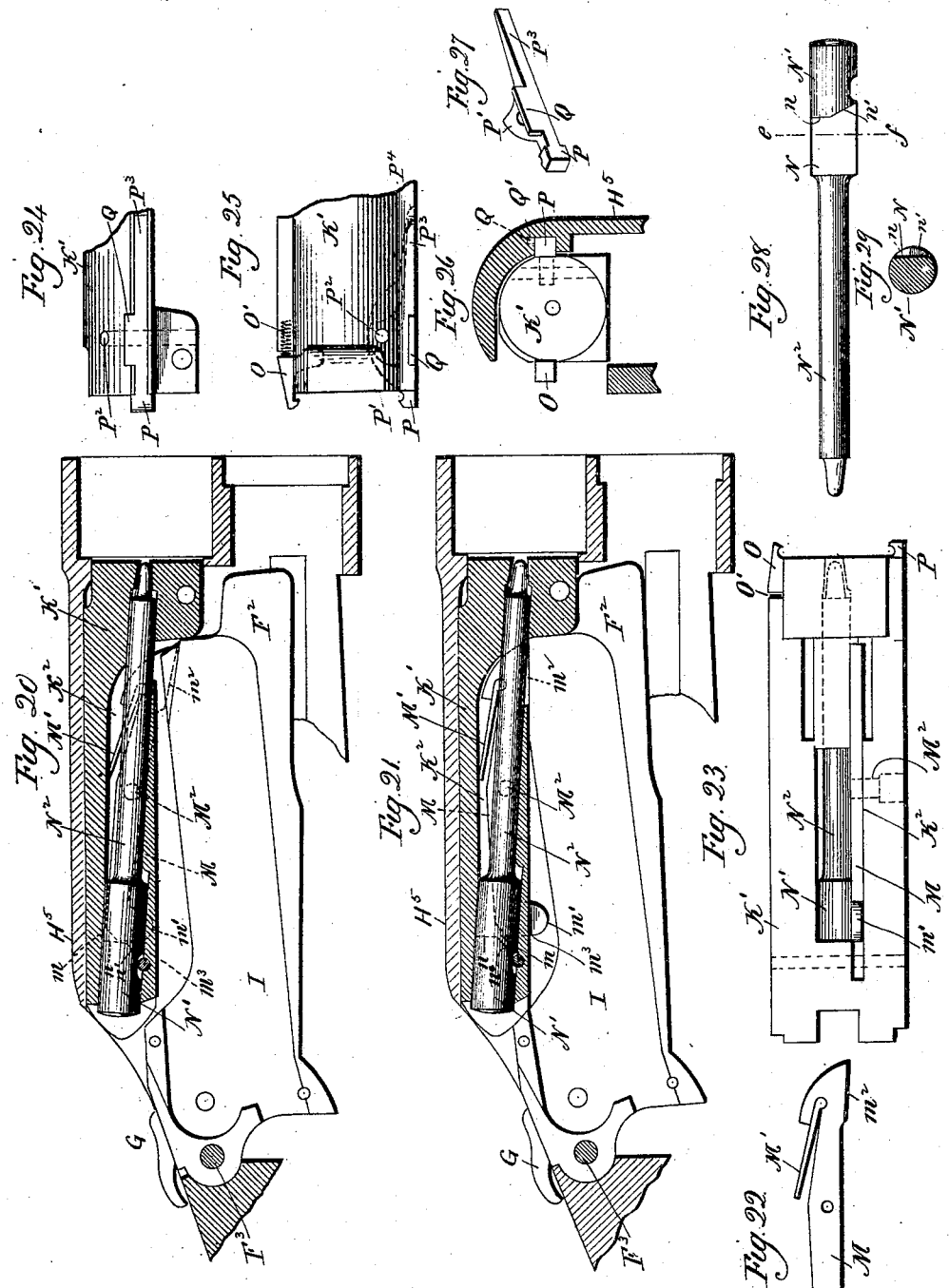

UNITED STATES PATENT OFFICE.

THOMAS G. BENNETT AND WILLIAM MASON, OF NEW HAVEN, CONNECTICUT, ASSIGNORS TO THE WINCHESTER REPEATING ARMS COMPANY, OF SAME PLACE.

MAGAZINE-FIREARM.

SPECIFICATION forming part of Letters Patent No. 599,587, dated February 22, 1898.

Application filed May 29, 1897. Serial No. 638,710. (No model.)

*To all whom it may concern:*

Be it known that we, THOMAS G. BENNETT and WILLIAM MASON, of New Haven, in the county of New Haven and State of Connecticut, have invented a new Improvement in Firearms; and we do hereby declare the following, when taken in connection with the accompanying drawings and the letters of reference marked thereon, to be a full, clear, and exact description of the same, and which said drawings constitute part of this specification, and represent, in—

Figure 1, a broken view, in side elevation, of a firearm embodying our invention; Fig. 2, a plan view thereof; Fig. 3, a less comprehensive broken view of the gun, partly in vertical longitudinal section and partly in elevation, shown in its closed position and drawn on a larger scale; Fig. 3ª, a sectional view on line *f g* of Fig. 3; Fig. 4, a detail view showing the buffer-spring and the coaction thereof with the safety stop-lever in the vertical oscillating carrier of the action mechanism; Fig. 5, a detached perspective view of one form which the buffer-spring may assume; Fig. 6, a detail view, in horizontal section, through the carrier and rear end of the action-bar on the line *a b* of Fig. 4, the stop-lever being in position for engagement with the rear end of the action-bar and blocking the opening of the gun; Fig. 7, a similar view in which the stop-lever is shown in its retired position for clearing the rear end of the action-bar and permitting the opening of the gun; Fig. 8, a broken detached reverse plan view of the rear end of the action-bar; Fig. 9, a broken view of the gun, partly in side elevation and partly in vertical longitudinal section, showing the carrier in its open position and illustrating the lifting of the cartridge-guide by means of the stationary lifting-pin mounted in the receiver; Fig. 10, a similar view showing the gun partly closed and illustrating how a screw or projection on the breech-block engages with the cartridge-guide for retiring the same; Fig. 11, a view in transverse section on the line *c d* of Fig. 10; Fig. 12, a detached side view of the vertically-oscillating carrier with the cartridge-guide removed; Fig. 13, a similar reverse plan view of the carrier; Fig. 14, a detached face view of the cartridge-guide; Fig. 15, a detached edge view thereof; Fig. 16, a detached view of the plate friction-spring of the cartridge-guide; Fig. 17, an edge view thereof; Fig. 18, a broken view, in side elevation, showing a modified form of friction-spring for the cartridge-guide; Fig. 19, a view thereof in longitudinal section; Fig. 20, a broken view, in vertical longitudinal section, showing the firing-pin retracted and locked by the firing-pin stop; Fig. 21, a similar view showing the firing-pin unlocked by the depression of the rear end of the firing-pin lock under the action of the carrier; Fig. 22, a detached view, in side elevation, of the firing-pin lock; Fig. 23, a detached reverse plan view of the breech-block, showing the firing-pin lock and also showing the two yielding extractors; Fig. 24, a broken view, in side elevation, of the forward end of the breech-block, showing one of its extractors having a guiding-flange; Fig. 25, a broken plan view of the breech-block, showing both of its extractors; Fig. 26, a sectional view showing how the guiding-flange of one of the yielding extractors is received by a groove formed for it in a portion of the receiver; Fig. 27, a detached perspective view of the extractor having a guiding-flange; Fig. 28, a detached view of the firing-pin; Fig. 29, a view thereof in transverse section on the line *e f* of Fig. 28.

Our invention relates to an improvement in magazine-firearms of the type in which the action mechanism is actuated by means of a sliding supporting and actuating handle which is reciprocated back and forth in a line parallel with the axial line of the gun-barrel, the object of our invention being to increase the safety and reliability of these arms.

With these ends in view our invention consists in certain details of construction and combinations of parts, as will be hereinafter described, and pointed out in the claims.

In carrying out our invention as herein shown we employ a buffer-spring A, the forward edge of which is abutted against the rear edge of an annular handle-stop B, encircling the tubular magazine B' and located thereupon in suitable position, which will depend upon the length of the magazine and the excursion of the tubular sliding supporting and actuating handle C, which is designed to be reciprocated back and forth upon the magazine in a line parallel with the axial line of the gun-barrel D. It will be observed that the handle-stop and buffer-spring are constructed and arranged so as to be located within the handle, which moves back and forth over them and the rear end of which coacts with them. When the said handle reaches the limit of its forward excursion, the forward edge of the metal action-bar sleeve E, which is secured within the rear end of the handle and forms a part thereof so far as the handle-stop is concerned, abuts against the rear edge of the spring, which cushions and absorbs the shock or concussion caused by smartly pushing the handle forward, whereby the racking of the gun is avoided and other important ends accomplished, as will be stated later on. The said action-bar sleeve E is secured within the rear end of the sliding handle C by means of one or more screws e, one of which is shown in Fig. 1. The action-bar E', which extends rearwardly from the handle for operative connection with the action mechanism of the gun, is made integral with the said sleeve or made independent thereof and attached thereto, as found most desirable.

The gun is constructed and arranged so that it is not locked in its closed position until the handle has been thrown forward far enough to compress the spring, which then in its effort to recover its normal extension takes up the slack and prevents the sliding handle and action-bar from rattling when the gun is closed and locked. We prefer to employ a buffer-spring in the manner above described. It is not, however, imperative, for the handle may be brought to a stop upon a handle-stop located upon the tubular magazine in case the gun is a tubular magazine-gun, or upon the gun-barrel in case the handle is mounted upon the gun-barrel, or located upon a fore-arm in case the handle is mounted upon the fore-arm.

In each of the constructions mentioned the stop will be located forward of the receiver of the arm and limit the forward excursion of the handle. Such a stop—that is, a stop located forward of the receiver of the arm and coacting with the handle—may be made much larger and heavier than a stop constituting a feature of the connection between the action-bar of the handle and the action mechanism of the gun. By our invention, therefore, we transfer the stop for limiting the forward excursion of a sliding supporting-handle from the rear end of the action-bar to the handle and locate it at a point forward of the receiver of the arm. We prefer to employ a buffer-spring in conjunction with this stop wherever it is located; but, as before said, the buffer-spring is not imperative and may be dispensed with. The said buffer-spring A may be of any suitable construction. We prefer, however, to employ such a spring as is shown in Figs. 4 and 5, and which consists of a thin sheet-metal tube having parallel interrupted slits a formed in it, so as to make it longitudinally compressible and expansible. All of these slits are made shorter than the full circumference of the spring, and they are interrupted or dodged, so that uncut portions of the metal are in opposition to the cut portions thereof. The spring thus retains its tubular form, being at the same time very resilient. The inside and outside of this spring are perfectly flat and smooth, while its edges are square and lie in parallel planes. As aforesaid, we do not limit ourselves to such a spring as described, but now prefer to use it on account of its compactness and on account of its special form, which gives it great power, considering the space it occupies. Moreover, when compressed it is not distorted or enlarged in diameter, and thus will not foul the action of the gun. In addition to the performance of a buffing or cushioning function the said spring also acts as a supplemental spring for the safety stop-lever F, which is pivoted in a horizontally-arranged recess F', formed in the left-hand side wall of the vertically-oscillating carrier $F^2$, which is swung by its rear end on a horizontal pivot $F^3$. This stop-lever, we may here remark, is disclosed in United States Patent No. 564,421, granted July 21, 1896, to Thomas G. Bennett, as assignor to the Winchester Repeating Arms Company. Reference to that patent, therefore, renders a detailed explanation of the construction and function of this lever unnecessary. It may be said, however, that for coaction with the stop-lever the extreme rear end of the action-bar is beveled, as at e', the said lever coacting with a bevel $e^2$, formed at the forward end of the stop-lever F, which swings upon a vertically-arranged pivot f, and is furnished with a spring f', located at a point in front of the pivot f and in the bottom of the recess $F^4$, as clearly shown in Fig. 7. The said spring f' exerts a constant effort to throw the forward end of the stop-lever out into the path in which the action-bar E' travels in reciprocating back and forth with the handle C. The rear end of the stop-lever is formed with an inwardly-projecting beveled operating-finger $f^2$, which plays through a transverse opening $f^3$, formed in the carrier, and coacts with the hammer G of the arm in the manner fully set forth in the before-mentioned patent. This stop-lever, independent of the buffer-spring, constitutes an effectual block or check against the opening of the gun by the user thereof if he is pulling rearward upon the sliding, supporting, and actuating handle at the time he pulls the trigger and in the interval between the falling of the hammer and the explosion of the cartridge; but the buffer-spring coacts with the stop-lever in such a manner that the same becomes an effectual block against the premature opening of the gun if the user, instead of pulling rearward upon the sliding handle at the time he pulls the trigger and in the interval between the falling of the hammer and the explosion of the cartridge in case of a hang-fire, is not exerting pressure in either direction upon the handle. In the instance last suggested and where there is neither pressure forward nor draft rearward upon the handle the buffer-spring in its effort to recover itself will push rearward upon the handle, and hence upon the action-bar, with sufficient force to prevent the beveled forward end of the stop-lever from disengaging itself from the beveled rear end of the action-bar, notwithstanding the fact that the hammer has fallen and, acting through the operating-finger $f^2$ of the stop-lever, has placed the same under that tension which under ordinary circumstances would cause its forward end to move inward and clear the rear end of the action-bar.

The next feature of our invention to be described is the cartridge-guide H, Fig. 14, which is formed of a thin plate of sheet metal and located, as shown, though not necessarily, in a shallow recess I, formed in the right-hand wall of the carrier $F^2$. This cartridge-guide is designed to be held in its projected or operating position by means of friction, as will be described later on. Its rear end is formed with a perforation $h$ for the reception of the horizontal pin H′, upon which it swings. It is placed under frictional restraint by a spring, which may assume a variety of forms. As shown in Figs. 3, 9, 10, 11, and 16, this spring consists of a sheet-metal plate J, which is very slightly sprung. This plate is formed with a perforation J′, which adapts it to be applied over and secured in place by one end of the pin H′, upon which the cartridge-guide itself swings, as aforesaid. The friction between the inner face of this spring-plate and the adjacent surface of the guide is sufficient to hold the same in its projected position without other aid. The guide is lifted into that position by means of a stationary horizontal lifting-pin $H^2$, mounted in and projecting inwardly from the right-hand wall of the receiver $H^5$ and shown in section in Fig. 9, which, however, represents the said wall broken away. The said pin coacts with a lifting-bevel $H^3$, formed at the rear end of the guide and upon the lower edge thereof. When in the action of the gun the carrier swings down preparatory to receiving a cartridge from the tubular magazine, the said lifting-bevel $H^3$ of the guide engages with the pin $H^2$, whereby the frictional restraint placed upon the guide by the spring J is overcome, so that the guide is lifted into its projected position, in which it is held by friction and in which it is shown in Fig. 9, the engagement of the guide with the pin taking place some time before the carrier reaches its fully-depressed position. On the other hand, when the carrier begins to be lifted into its closed or elevated position the said lifting-bevel $H^3$ of the guide is immediately cleared from the pin $H^2$; but the guide being supported by friction does not then fall back, but remains in its projected position and performs its function of preventing the lateral displacement of the cartridge upon the carrier. However, after the cartridges have been partly introduced into the chamber of the gun-barrel a screw or equivalent projection K, located in the lower edge of the right-hand wall of the forward end of the breech-block K′, engages with the depressing-bevel $H^4$, formed in the upper edge of the guide near the forward end thereof and forces the guide downward into its retired position against the restraint of the friction-spring J.

Fig. 10 of the drawings shows the set-screw K just at the beginning of its engagement with the bevel $H^4$ for pushing the guide downward, while Fig. 3 shows the set-screw directly forward of the forward end of the guide, the screw having assumed this relation to the guide by the lifting of the carrier, and hence the guide, in the final closing of the gun. It will be seen that by means of the construction just described we provide for the operation of the guide by extremely simple means, which do not call for positively supporting the guide in its projected or active position.

In Figs. 18 and 19 we have shown a modification in which the flat plate-spring J is dispensed with and a coiled spring $J^2$ is employed, the said coiled spring $J^2$ being located in a shallow recess $J^3$, formed in the rear end of the right-hand wall of the carrier and concentric with the pin H′, upon which the guide $J^4$ swings, as clearly shown in Fig. 19. The outer coil of this spring is designed to engage with the inner face of the rear end of the cartridge-guide with sufficient force to afford a frictional restraint for the same.

We shall next describe our improved firing-pin lock M, Fig. 22, which has the peculiarity of being primarily held in its locked position by means of a spring M′, which may be formed independently of it, as shown in the said figure, or formed integral with it. This lock consists of a heavy flat plate M or bar, which is located in a vertical longitudinal slot $K^2$, formed in the lower face of the breech-block K′ at a point to one side of the longitudinal center thereof, the lock being hung upon a horizontal pin $M^2$. The rear end of this lock is formed with a retracting-bevel $m$, a lifting cam-like nose $m'$, and a square locking edge $m^3$, and works in a shallow recess N, formed by facing away a portion of one side of the cylindrical butt N′ of the firing-pin $N^2$, a detached view of which is shown in Fig. 28. The rear end of the said beveled recess N in the firing-pin terminates in a wall comprising a square locking-shoulder $n$ and a beveled retracting-shoulder $n'$. The said lock M is forced into and maintained in its retired position by the carrier, which, as it goes into its fully-closed position, engages with the lower edge of the forward end of the lock at about the point $m^3$, whereby the spring M′ is compressed and the lock swung on its pin M², so as to depress its rear end and clear the square locking edge $m^3$ thereof from the locking-shoulder $n$ of the pin, which is thus left free to leap forward when struck by the hammer G. The moment, however, that the carrier begins its descent in the opening of the gun the spring M' asserts itself, swings the firing-pin lock on its pivot, depressing its forward end and lifting its rear end into the position in which it is shown in Fig. 20. During the described lifting of the rear end of the lock its retracting-bevel $m$ engages with the retracting-shoulder $n'$ of the firing-pin, causing the same to be positively retracted under the influence, as it will be observed, of the spring M'. The firing-pin having been thus retracted, the spring M' lifts the rear end of the lock still farther, so that the square locking edge $m^3$ thereof is at last brought into direct opposition with the square locking-shoulder $n$ of the firing-pin, as clearly shown in said Fig. 20. If for any reason, however, the spring M' should not act in swinging the lock for the retraction and locking of the firing-pin, as explained, the nose $m'$ of the lock will, in the rearward excursion of the breech-block K', engage with the upper face of the rear end of the carrier and positively lift the rear end of the lock, so as to retract and lock the pin, whereby the retraction and locking of the pin is insured even though the spring M' may fail of performing that function. Then when the gun is closed and the breech-block makes its forward excursion the lifting-nose $m'$ of the lock again rides over the carrier and, if not already lifted, is lifted thereby, so as to insure the retraction and locking of the firing-pin in case it happens that for any reason it is not retracted and locked at the time. After the breech-block has reached the limit of its forward excursion the carrier rises and engages with the forward end of the lock, overcoming the tension of its spring M' and depressing its rear end for unlocking the firing-pin and leaving the same free to leap forward under the action of the hammer. It will be understood, of course, that the carrier does not act upon the stop in the manner described until nothing remains to be done in fully closing the gun except the final movement of the carrier represented by a fraction of an inch, the idea being to hold the firing-pin locked until the gun is virtually closed.

The next feature of our improvement to be described is an improved extractor. As herein shown, the breech-block K' is provided with two yielding extractors O and P. The extractor O is of ordinary construction and is made yielding by means of a spiral spring O', inserted into a small chamber formed for its reception in the breech-block. The extractor P, which contains our present improvement, is formed with an inwardly-projecting flange P', perforated for the reception of a vertically-arranged pin P², upon which the extractor swings, the extractor having a long rearwardly-extending yielding tail P³, which is received in a slot P⁴, formed in the breech-block for the reception of the extractor. The said extractor P is adapted to perform a guiding function, being thereto formed with an upwardly-extending guiding-flange Q. (Best shown in Fig. 27.) This flange travels back and forth in a groove Q', formed to receive it in the left-hand wall of the receiver and extending throughout the length thereof. This guiding-flange and groove assist in guiding the breech-block and prevent the same from swerving and cramping in any portion of its excursion. It is not necessary, of course, that the yielding extractor P should be employed in conjunction with an extractor like the extractor O, which may be of any suitable form and construction and made yielding or not, the essential feature of our invention, so far as the extractor is concerned, being the provision of an extractor with a guiding-flange.

The last feature of our improvement is provision for positively locking the tubular magazine from turning and getting loose. With this end in view we employ a screw R, which is located in a transversely-arranged threaded screw-hole formed in the lower portion of the forward end of the receiver II⁵ and enters a transverse hole or locking-recess R', formed to receive it in the rear end of the tubular magazine, which is thus firmly locked against rotation in either direction and prevented from working loose, which it otherwise might do. If desired, this screw may be replaced by a pin. One or more screws or one or more pins may be employed, and they may be employed in conjunction with screw-threads on the magazine, or the same may be dispensed with.

It is apparent that in carrying out our invention some changes from the construction herein shown and described may be made, and we would therefore have it understood that we do not limit ourselves to the exact construction shown, but hold ourselves at liberty to make such changes and alterations as fairly fall within the spirit and scope of our invention.

Having fully described our invention, what we claim as new, and desire to secure by Letters Patent, is—

1. In a tubular magazine-firearm, the combination with the tubular magazine thereof, of a tubular sliding supporting and actuating handle mounted thereupon, a handle-stop located upon the said magazine and within the said tubular handle which moves back and forth over it, and a buffer-spring interposed between the said stop and the rear end of the handle, the forward excursion of which is limited and cushioned by the coaction of the said handle-stop and spring.

2. In a tubular magazine-firearm, the combination with the tubular magazine thereof, of a sliding supporting and actuating handle mounted thereupon, an annular handle-stop encircling the magazine and located within the handle which moves back and forth over it, a sleeve located within the rear end of the handle, and a buffer-spring interposed between the forward edge of the said sleeve and the rear edge of the said annular stop.

3. In a tubular magazine-firearm, the combination with a tubular magazine, of a sliding supporting and actuating handle mounted upon the said magazine, a handle-stop located upon the said magazine and within the handle which moves back and forth over it, an action-bar sleeve located within the rear end of the handle to which it is rigidly secured, a buffer-spring located between the forward edge of the said sleeve and the rear edge of the stop by which the forward excursion of the handle is arrested, and an action-bar rigidly connected with the said sleeve and extending rearward therefrom for connection with the action mechanism of the gun.

4. In a tubular magazine-firearm, the combination with the tubular magazine thereof, of a handle-stop located thereupon, a buffer-spring encircling the said magazine and placed against the rear edge of the said stop, a sliding supporting and actuating handle mounted upon the magazine for reciprocation thereupon, and a sleeve located within the said handle and secured thereto and engaging with the said spring for receiving and cushioning the shock of the handle as the same reaches the limit of its forward excursion.

5. In a tubular magazine-firearm, the combination with a tubular magazine, of a sliding supporting and actuating handle mounted thereupon, an action-bar extending rearwardly from the said handle, means for preventing the premature opening of the gun in the interval between the falling of the hammer and the explosion of the cartridge in case of a hang-fire, a handle-stop located upon the magazine within the said handle, and a buffer-spring located within the said handle at a point at the rear of the said stop, and arranged to receive and cushion the shock of the handle as the same reaches the limit of its forward movement, and in its recoil action coacting with the said means for preventing the premature opening of the gun in case of a hang-fire, the recoil action of the said spring being communicated to the said means through the said action-bar which coacts directly therewith.

6. In a magazine-firearm, the combination with an oscillating carrier, of a frictionally-restrained cartridge-guide.

7. In a magazine-firearm, the combination with an oscillating carrier, of a frictionally-restrained cartridge-guide pivotally mounted upon the said carrier.

8. In a magazine-firearm, the combination with a vertically-oscillating carrier, of a cartridge-guide, and a friction-spring coacting with the guide for holding the same in its elevated position.

9. In a magazine-firearm, the combination with a vertically-oscillating carrier, of a cartridge-guide, pivoted thereto, and a flat plate-spring applied to the guide for frictionally restraining the pivotal movement thereof.

10. In a magazine-firearm, the combination with a vertically-oscillating carrier, of a frictionally-restrained cartridge-guide pivotally mounted upon the said carrier and formed at its rear end with a lifting-bevel, and a stationary pin arranged to coact with the said lifting-bevel at the rear end of the guide for lifting the same into its elevated position as the carrier moves into its open position.

11. In a magazine-firearm, the combination with a carrier, of a frictionally-restrained cartridge-guide, and a breech-block adapted to coact with the forward end of the guide to depress the same into its retired position.

12. In a magazine-firearm, the combination with a vertically-oscillating carrier, of a cartridge-guide pivoted thereto, means for imposing frictional restraint upon the cartridge-guide, a stationary pin mounted in the receiver and coacting with the rear end of the cartridge-guide for lifting the same into its elevated position when the carrier moves into its open position, and a reciprocating breech-block adapted at its forward end to coact with the forward end of the guide for depressing the same into its retired position.

13. In a firearm, the combination with the breech-block thereof, of a firing-pin located in the said block, and a spring-actuated firing-pin lock coacting with the firing-pin and primarily moved for retracting and locking the firing-pin by means of its spring.

14. In a firearm, the combination with the breech-block thereof, of a firing-pin located in the said block, and a spring-actuated firing-pin lock coacting with the firing-pin and primarily moved for retracting and locking the firing-pin by means of its spring, and formed at its rear end with a locking edge and a retracting-bevel, respectively coacting with a locking-shoulder and a retracting-shoulder formed upon the firing-pin.

15. In a firearm, the combination with the breech-block thereof, of a firing-pin located in the said block, and a firing-pin lock coacting with the firing-pin and primarily moved for retracting and locking the firing-pin by means of a spring, and formed at its rear end with a lifting-nose which engages with a portion of the arm as the breech-block is retracted, for positively lifting the rear end of the lock in case the spring thereof fails to act.

16. In a firearm, the combination with the reciprocating breech-block, of a firing-pin mounted therein, a firing-pin lock pivotally mounted in the breech-block, provided at its forward end with an actuating-spring, and adapted at its rear end to coact with the firing-pin for retracting and locking the same, and a vertically-oscillating carrier coacting with the forward end of the lock for moving the same against the tension of its spring, into position for releasing the firing-pin, at the final closing of the arm.

17. In a firearm, the combination with a breech-block, of an extractor formed with an inwardly-projecting flange which is perforated for the reception of a vertically-arranged pin upon which it swings and which is mounted in the breech-block, with a long yielding tail extending rearwardly beyond the said flange and the pivot upon which the extractor swings, and with an upwardly-extending guiding-flange which enters and travels back and forth in a groove made to receive it in the left-hand wall of the receiver-chamber of the gun.

In testimony whereof we have signed this specification in the presence of two subscribing witnesses.

THOMAS G. BENNETT.
WILLIAM MASON.

Witnesses:
THOS. C. JOHNSON,
DANIEL H. VEADER.